United States Patent
Gage et al.

(10) Patent No.: US 7,325,069 B1
(45) Date of Patent: Jan. 29, 2008

(54) METHOD OF ESTABLISHING BI-DIRECTIONAL CONNECTIVITY OF A NETWORK ELEMENT IN A NETWORK

(75) Inventors: Timothy M. Gage, Durham, NC (US); Yi Yang, Morrisville, NC (US); Donnie V. Savage, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1062 days.

(21) Appl. No.: 10/010,919

(22) Filed: Dec. 7, 2001

(51) Int. Cl.
*G06F 15/16* (2006.01)
(52) U.S. Cl. ...................................................... 709/238
(58) Field of Classification Search ................ 709/228, 709/238; 711/205; 370/395.31, 254, 395, 370/395.42, 395.43, 352
See application file for complete search history.

(56) References Cited

U.S. PATENT DOCUMENTS

| | | | |
|---|---|---|---|
| 5,805,818 A * | 9/1998 | Perlman et al. .............. | 709/224 |
| 6,414,955 B1 * | 7/2002 | Clare et al. .................. | 370/390 |
| 6,456,599 B1 * | 9/2002 | Elliott ......................... | 370/254 |
| 6,856,627 B2 * | 2/2005 | Saleh et al. .................. | 370/397 |
| 7,031,288 B2 * | 4/2006 | Ogier ........................... | 370/338 |
| 2001/0040895 A1 * | 11/2001 | Templin ....................... | 370/466 |
| 2002/0012320 A1 * | 1/2002 | Ogier et al. ................. | 370/252 |
| 2003/0095504 A1 * | 5/2003 | Ogier ........................... | 370/235 |

OTHER PUBLICATIONS

Haas, Zygmunt J., "The Performance of Query Control Schemes for the Zone Routing Protocol", Aug. 2001, IEEE/ACM Transactions on Networking, vol. 9, No. 4.*

* cited by examiner

*Primary Examiner*—Andrew Caldwell
*Assistant Examiner*—Benjamin A Ailes
(74) *Attorney, Agent, or Firm*—Campbell Stephenson LLP

(57) ABSTRACT

The present invention describes a method and apparatus to ensure bi-directional connectivity between neighbor network elements in distance-vector protocol (e.g., EIGRP). The method further defines the dampening of neighbors that cannot establish a bi-directional connectivity. When a router receives an unreliable packet from a neighbor, the router adds the neighbor in neighbor table by gradually developing the reliability of the neighbor. First, the router adds neighbor's address into a dampening table and a 'neighbor pending' table. The router establishes a reliable communication with the neighbor. If the router cannot establish the reliable communication with the neighbor, the router dampens the neighbor and removes neighbor's address from 'neighbor pending' table. When the router establishes a reliable communication with the neighbor, the router 'promotes' the neighbor to the neighbor table. The router does not 'advertise' neighbor in its neighbor table until the neighbor is 'promoted' to the neighbor table.

50 Claims, 5 Drawing Sheets

METHOD OF ESTABLISHING BI-DIRECTIONAL CONNECTIVITY OF A NETWORK ELEMENT IN A NETWORK

BACKGROUND OF THE INVENTION

Field of the Invention

Distance-vector routing protocols (e.g., Enhanced Interior Gateway Routing Protocol (EIGRP)) require that each router send all or a portion of its routing table in a routing update message at regular intervals to each of its neighbor routers. The distance-vector routing protocols ("the protocol") sends partial updates of its routing table when the metric for a route changes. Each router maintains a neighbor table. When a new router is added to a network, the new router sends an unreliable packet to a well known address on all interfaces with the protocol enabled. The unreliable packet includes a hold time during which the new router must receive a response from the neighbors. In the protocol, reliability is provided only when necessary. A router that receives unreliable packets need not acknowledge the unreliable packets. Upon receiving an unreliable packet from a new router, the neighbors of the new router adds the address of the new router to their neighbor table and sends an unreliable packet on the same interface through which the new router's unreliable packet was received. The new router adds neighbors into the neighbor table when the new router receives a response to the unreliable packet from the neighbors.

Using a neighbor discovery/recovery process, each router dynamically learns about other routers in its network, and maintains the relationships by periodically sending packets to inform its neighbors that the router is 'alive'. When a router does not receive a packet from a neighbor within a certain amount of time, the router assumes that the neighbor has become unreachable or inoperative and removes the neighbor from the neighbor table.

It is possible to build a 'one-way' neighbor relationship between two routers. If a link is functioning in one direction from a first router to a second router, then the second router intermittently recognizes the first router as a neighbor. However, the first router does not recognize the second router as a neighbor.

FIG. 1 illustrates an example of the current implementation problem stated above where a one way neighbor relationship is temporarily formed in network 100. Network 100 includes a router 110. For the purposes of illustration, router 110 is coupled to a router 120 via two one-way links, links 115A and 115B. Link 115A transmits data in one direction, from router 110 to router 120, and link 115B transmits data in the other direction, from router 120 to router 110. As depicted in FIG. 1, link 115B is broken and cannot transmit data in the direction of router 110 from router 120. Links 115A and 115B can be, for example, a broken two-way link with ability to transmit data in one direction. Router 110 is further coupled to other routers in network 100 via links 105 and 107. Router 120 is coupled similarly to other routers in network 100 via links 122 and 127.

For the purposes of example, router 110 is a newly added router in network 100. Router 110 establishes a neighbor relationship with other routers by sending an unreliable packet 130 to a known address (e.g. links 115A and 105). Router 120 receives packet 130 and determines whether router 110 is in its neighbor table. If router 110 is in the neighbor table of router 120, router 120 updates a neighbor hold time to continue consideration of router 110 as a neighbor, and does not take any further action. If router 110 is not in the neighbor table of router 120, router 120 adds router 110 to its neighbor table and sends an unreliable packet 140 on the same interface on which packet 130 is received (e.g., links 115A and 115B).

Router 120 then sends a reliable packet 150 to router 110 on link 115B. Because link 115B is not functional, router 110 does not receive unreliable packet 140 and reliable packet 150 thus router 110 does not add router 120 to its neighbor table. In the protocol (e.g., EIGRP), reliable packets require acknowledgement from the receiving router. Acknowledgments are sent using unreliable packets. Router 110 does not acknowledge reliable packet 150. When router 120 does not receive an acknowledgement within certain predetermined time interval, router 120 removes router 110 from the neighbor table. Every time router 120 receives a periodic unreliable packet from router 110, router 120 adds router 110 to its neighbor table and then removes router 110 from the neighbor table when router 120 does not receive an acknowledgement from router 110.

Router 120 intermittently recognizes router 110 as neighbor, however router 110 does not recognize router 120 as neighbor. When topology changes occur in Network 100, Router 120 will see Router 110 as a neighbor and attempt to forward the topology changes to Router 120 via reliable packets. Because Router 110 is not able to receive reliable packets from Router 120, other routers in network 100 will build incorrect neighbor topology and can cause network congestion. A method and apparatus is needed to ensure bi-directional connectivity between neighbor network elements (e.g., in EIGRP).

SUMMARY

The present invention describes a method of establishing bi-directional connectivity of a network element in a network. The method includes receiving a first unreliable packet from the network element, storing an address of the network element in a neighbor pending list, sending a reliable packet to the network element and if an acknowledgement to the reliable packet is received from the network element, accepting the network element as a neighbor. The unreliable packet does not require a response and the reliable packet requires a response. The method further includes if the address of the network element is in the neighbor list, updating a neighbor hold count for the network element. The method further includes determining if the address of the network element is in a dampening list and if the address of the network element is in the dampening list, updating a value of a reliability count of the network element to reflect higher reliability of the network element.

The method further includes if the value of the reliability count is a maximum value, moving the address of the network element from the dampening list to the neighbor pending list. The method further includes if the network element is not in the dampening list, adding the address of the network element to the dampening list, and setting the value of the reliability count of the network element to the maximum value. The method further includes setting the neighbor hold count for the network element and sending a second unreliable packet to the network element. The method further includes initiating a neighbor pending timer. The method further includes if the acknowledgement to the reliable packet is not received before the neighbor pending timer expires, removing the address of the network element from the neighbor pending list, and updating the value of the reliability count to reflect lower reliability of the network element. The method further includes if the acknowledgement to the reliable packet is received before the neighbor pending timer expires, moving the address of the network element from the neighbor pending list to the neighbor list, and removing the address of the network element from the dampening list.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention, which is defined in the claims following the description.

Introduction

The present invention describes a method and apparatus to ensure bi-directional connectivity between neighbor network elements in distance-vector protocol (e.g., EIGRP). The method further defines the dampening of neighbors that cannot establish bi-directional connectivity. When a router receives an unreliable packet from a neighbor, the router adds the neighbor in neighbor table by gradually developing the reliability of the neighbor. First, the router adds neighbor's address into a dampening table and a 'neighbor pending' table. The router then sends a reliable packet to the neighbor. If the neighbor does not respond within certain predetermined time, the router dampens the neighbor and removes neighbor's address from 'neighbor pending' table. Otherwise, when the router receives a response from the neighbor, the router 'promotes' the neighbor to the neighbor table.

The router continues to monitor the reliability of the neighbor and when communication with the neighbor becomes unreliable, the router begins 'demoting' the neighbor and after reaching certain low reliability threshold, the router dampens the neighbor. The 'full neighbor' relationship is established after the neighbor reliably communicates with the router. The router does not 'advertise' the neighbor in its neighbor pending table until the neighbor is 'promoted' to the neighbor table.

New Router's Packet Flow

Figure 1:
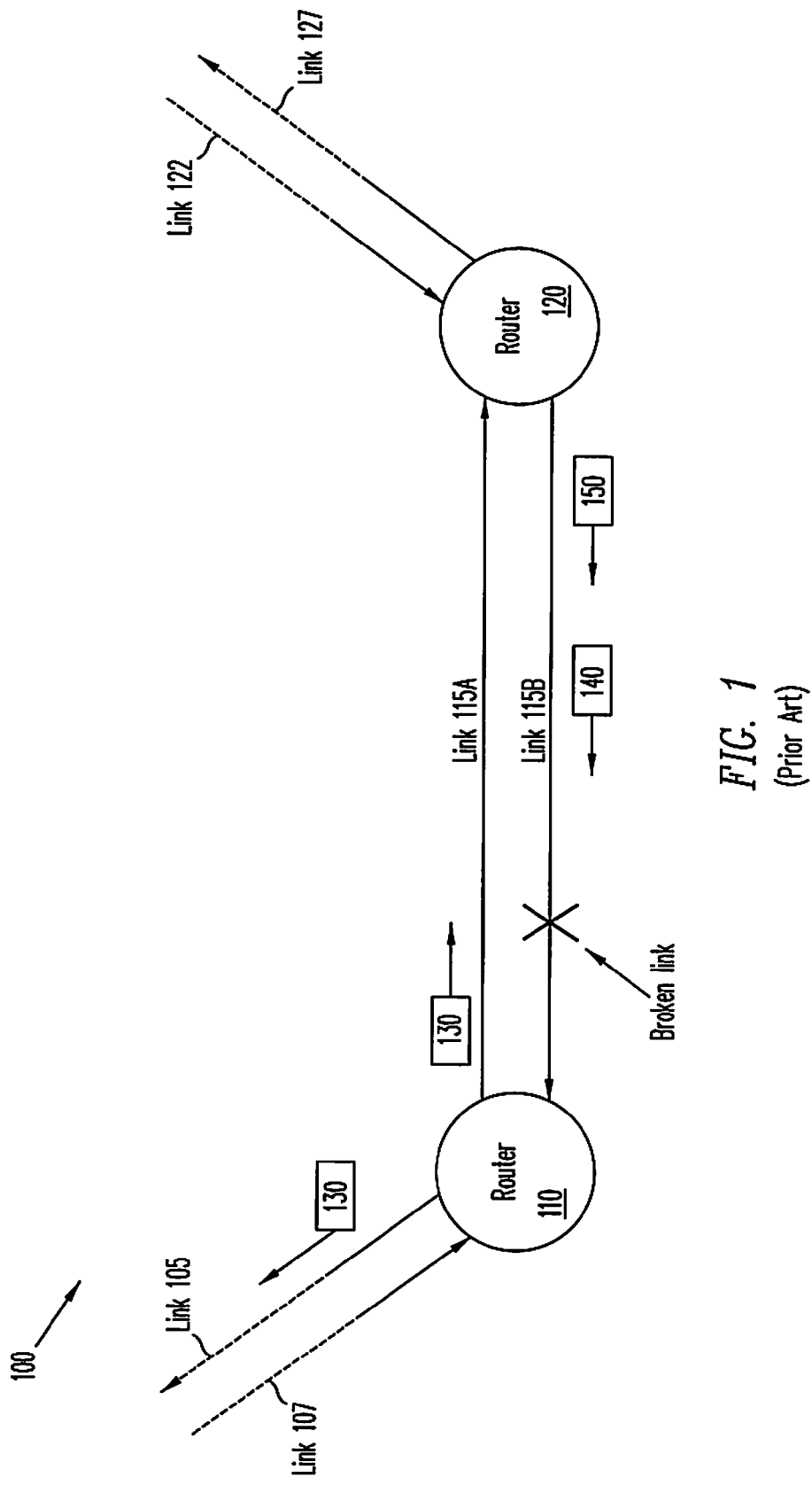
FIG. 1 illustrates an example of the current implementation problem stated above where a one way neighbor relationship is temporarily formed in network 100.
Figure 2:
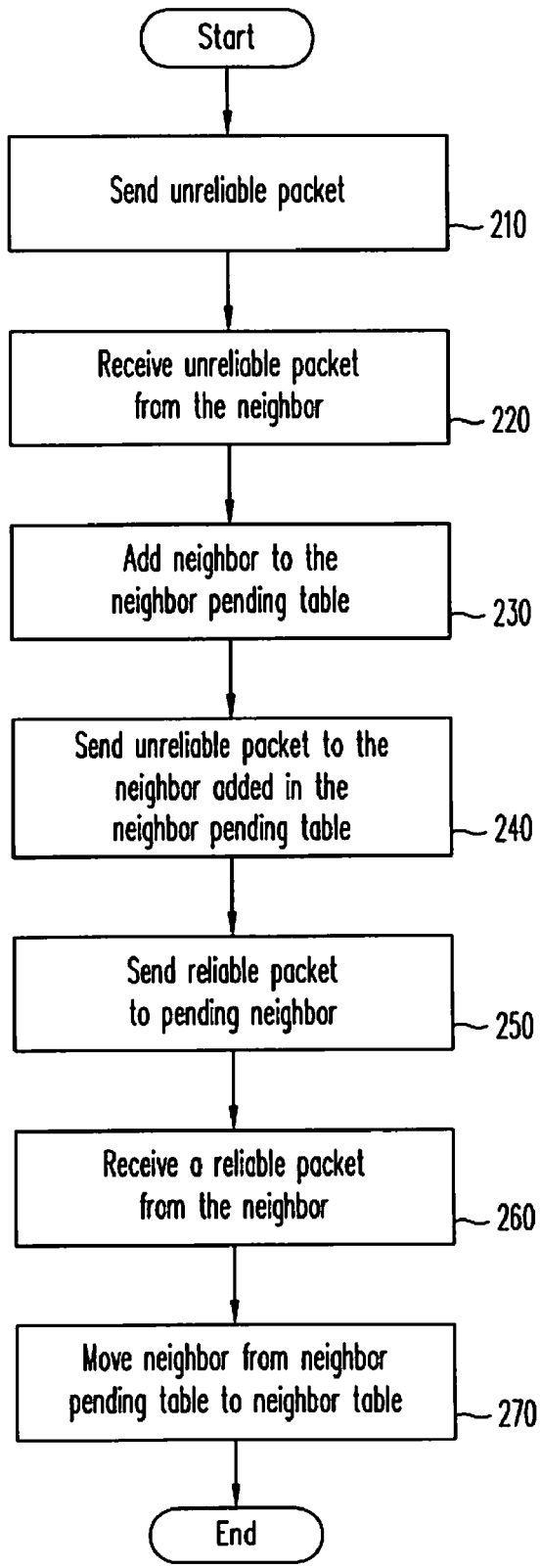
FIG. 2 illustrates a flow diagram of steps performed by a newly added router in a network during a process of establishing a neighbor relationship with other routers in the network according to an embodiment of the present invention.

FIG. 2 illustrates a flow diagram of steps performed by a newly added router in a network during a process of establishing a neighbor relationship with other routers in the network according to an embodiment of the present invention. Initially, the router sends an unreliable packet to a known address (step 210). The router then receives unreliable packets from neighbors (step 220). Upon receiving the unreliable packet from a neighbor, the router adds the address of that neighbor into a neighbor pending table (step 230). The router then sends a reliable packet to the neighbor added in the neighbor pending table (step 240). The router then sends a reliable packet to the pending neighbor (step 250). The router then receives a reliable packet from the neighbor (step 260). The router moves the neighbor from the neighbor pending table to the neighbor table (step 270).

Neighbor's Packet Flow

Figure 3A:
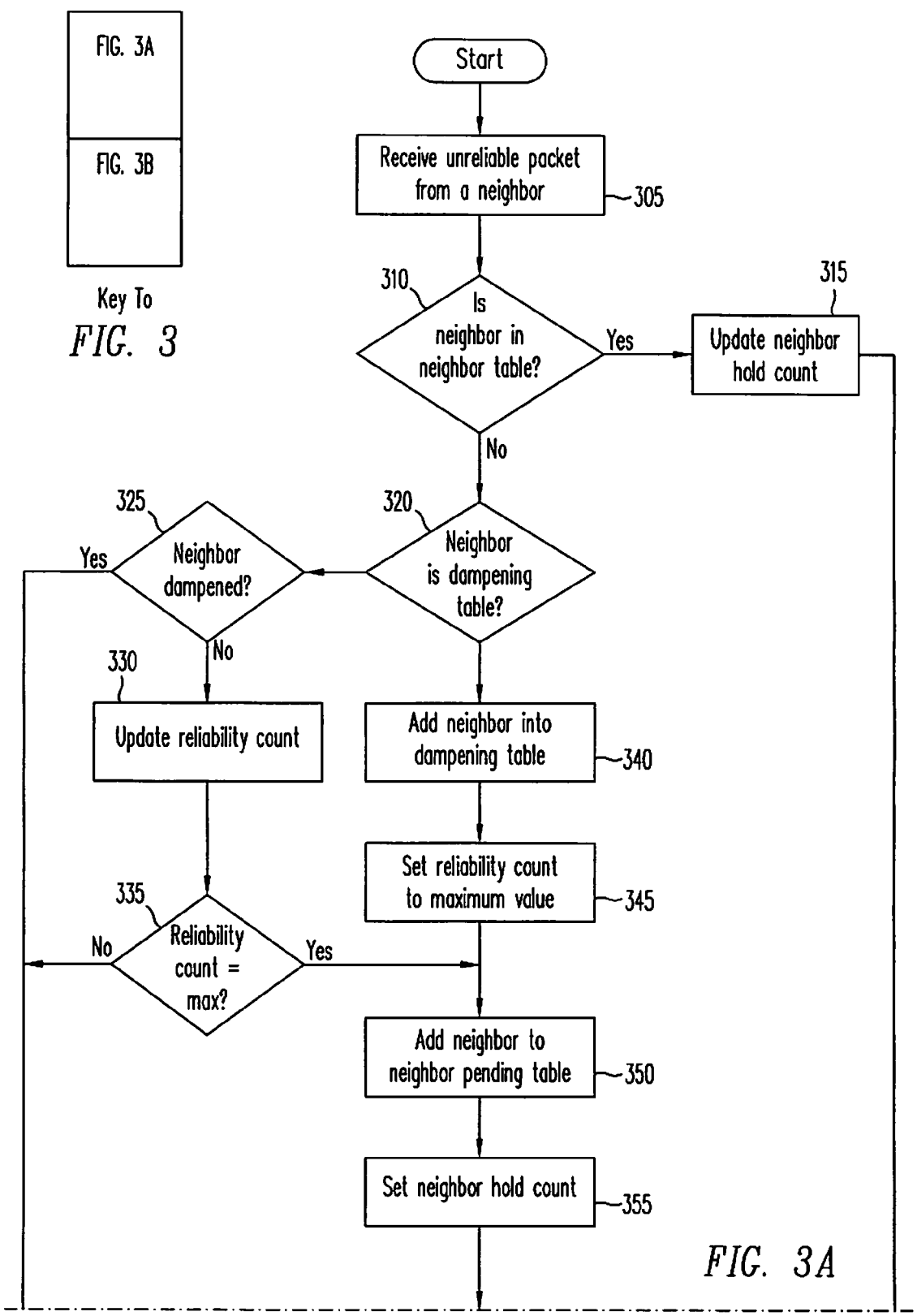
FIG. 3 illustrates a flow diagram of the steps performed by a router upon receiving an unreliable packet from a new neighbor in a network according to an embodiment of the present invention.
Figure 3B:
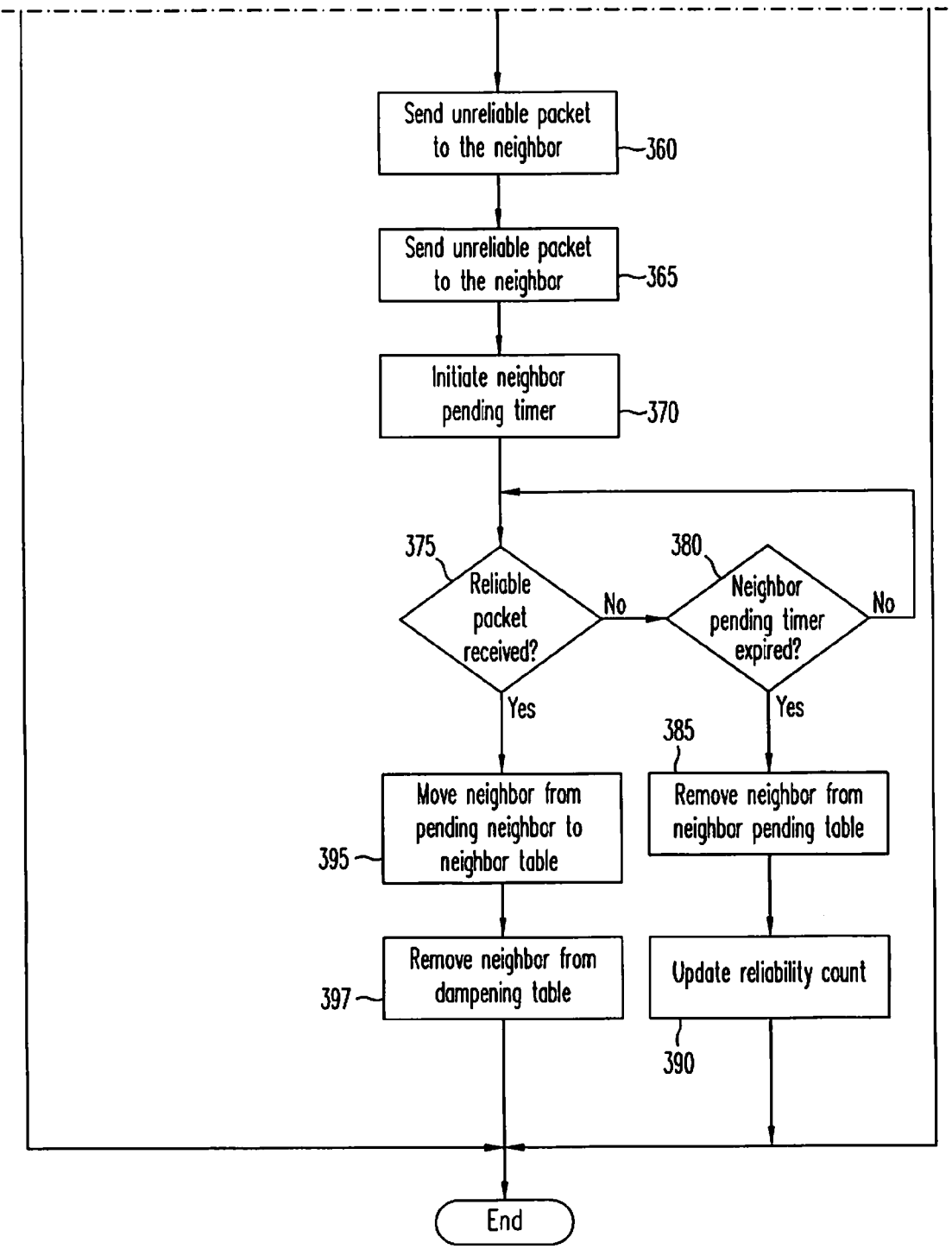

FIG. 3 illustrates a flow diagram of the steps performed by a router upon receiving an unreliable packet from a new neighbor in a network according to an embodiment of the present invention. Initially the router receives an unreliable packet from the neighbor (step 305). The router determines whether the neighbor's address is in the neighbor table (step 310). If the neighbor's address is in the neighbor table, the router updates a neighbor hold count (step 315). The neighbor hold count indicates the reliability of the neighbor. Methods of determining a hold count are known in the art. Once the neighbor hold count is updated, the router does not take any further action.

If the neighbor's address is not in the neighbor table, the router determines whether the neighbor's address is in a dampening table (step 320). The dampening table is a list that contains the addresses of neighbors that are not reliably communicating with the router. The router maintains a reliability count for each neighbor. The reliability count indicates the reliability of communications with the neighbor. The network administrator can determine a reliability scheme for a particular network configuration using methods of determining the reliability of communication known in art.

If the neighbor is in the dampening table, the router determines whether the neighbor is dampened (step 325). A neighbor is dampened when either the neighbor is inoperable or unreachable. A neighbor is determined to be dampened after the reliability of communication with the neighbor reaches a certain low reliability count threshold, as determined by the network administrator. If the neighbor is dampened, the router does not take any further action.

If the neighbor is not dampened, the router updates the reliability count for the neighbor to reflect higher reliability of communication with the neighbor (step 330). The reliability count can be updated according to a scheme determined by the network administrator (e.g., lowering the value of the reliability count by a predetermined number or the like). The router then determines whether the reliability count has reached a maximum value (step 335). The maximum value of the reliability count can be either predetermined (e.g., a value of zero can represent a maximum value or the like) or dynamically calculated by the router according to a network traffic condition. If the reliability count has not reached the maximum value, the router does not take any further action. If the reliability count has reached the maximum value, the router proceeds to add neighbor's address in a neighbor pending table (step 350). If the neighbor is not in the dampening table, the router adds the neighbor to the dampening table (step 340). The method of managing the dampening table is known in the art. The router sets the reliability count to a maximum value (step 345). The router sets the reliability count to the maximum value assuming that the router can establish a neighbor relationship with the neighbor. The router then adds the neighbor's address to the neighbor pending table (step 350). The neighbor pending table is a list that includes the address of new neighbors that have sent unreliable packets to initiate a neighbor relationship with the router. The router then sets the neighbor hold count (step 355).

Next, the router sends an unreliable packet on the same interface where the router receives the unreliable packet from the neighbor (step 360). The router send a reliable packet to the neighbor (step 365). The router then initiates a neighbor pending timer (step 370). The neighbor pending timer monitors the time elapsed until an acknowledgement is received from the neighbor. The value of the neighbor pending timer can be predetermined or dynamically calculated according to a network traffic condition. The router waits for a reliable packet (acknowledgement) from the neighbor.

The router determines whether a reliable packet (acknowledgement) is received from the neighbor (step 375). If the reliable packet (acknowledgement) is not received from the neighbor, the router determines whether the neighbor pending timer has expired (step 380). If the neighbor pending timer has not expired, the router continues to wait for the reliable packet (acknowledgement) from the neighbor. If the neighbor pending timer expires and the router has not received a reliable packet (acknowledgement) from the neighbor, the router removes the neighbor's address from the neighbor pending table (step 385). The router updates the reliability count to indicate lower reliability according to the reliability scheme determined by the network administrator (step 390). If the router receives a reliable packet (acknowledgement) from the neighbor before the neighbor pending timer expires, the router moves the neighbor's address from the neighbor pending table to the neighbor table (step 395). The router then removes the neighbor's address from the dampening table (step 397).

An Example of Software Architecture

Figure 4:
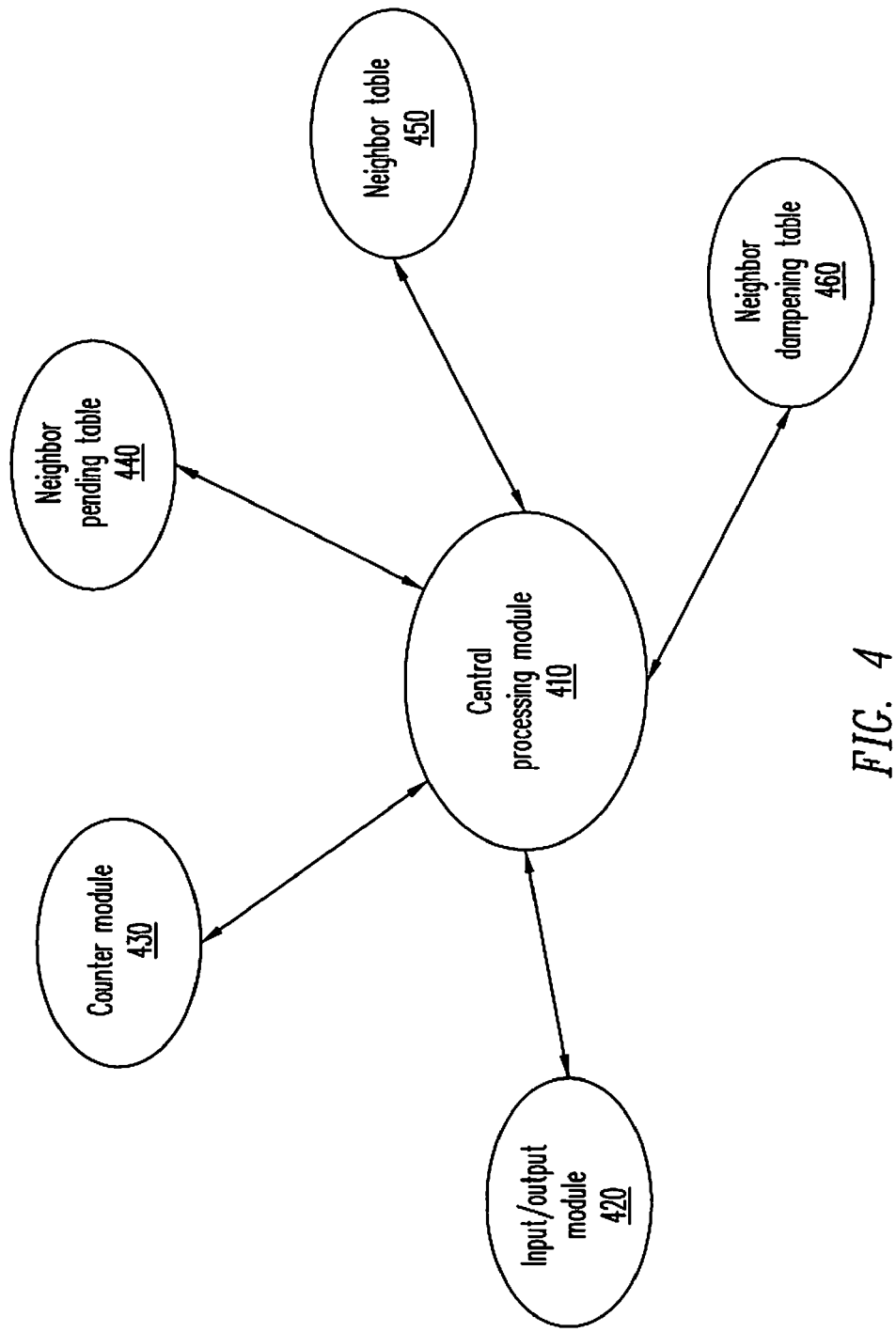
FIG. 4 illustrates an example of a software modular architecture implemented in a router according to an embodiment of the present invention.

FIG. 4 illustrates an example of a software architecture 400 implemented in a router according to an embodiment of the present invention. A central processing module 410 processes incoming packets to establish bi-directional connectivity with a neighbor. Central processing module 410 interfaces with an input/output module 420 (e.g., by executing commands, sending/receiving messages or the like). Input/output module processes incoming and outgoing packets according to processes defined by the protocol (e.g., EIGRP). A counter module 430 provides various counter and timer functions for central processing module 410 (e.g., neighbor pending timer, neighbor hold count and the like).

A neighbor pending table 440 stores a list of neighbor identifications (e.g., IP address or the like). Central processing module 410 uses neighbor pending table 440 to store the identifications (e.g., IP address or the like) of neighbors that are in the processes of establishing a bi-directional connectivity with the router. Neighbor pending table can be any data storage (e.g., linked list, hardware memory block or the like). A neighbor table 450 stores the identifications (e.g., IP address or the like) for neighbors that have established a bi-directional connectivity with the router. A neighbor dampening table 460 stores the identifications (e.g., IP address or the like) of neighbors that have unreliable or no communication with the router.

One skilled in art will appreciate that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various exemplary modules may be application specific hardware modules. The software modules discussed herein may include script, batch or other executable files, or combinations and/or portions of such files. The software modules may include a computer program or subroutines thereof-encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into sub-modules to be executed as multiple computer processes. Moreover, alternative embodiments may combine multiple instances of a particular module or sub-module. Furthermore, those skilled in the art will recognize that the operations described in exemplary embodiment are for illustration only. Operations may be combined or the functionality of the operations may be distributed in additional operations in accordance with the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
    establishing bi-directional connectivity of a network element in a network, comprising
        receiving a first unreliable packet from said network element;
        storing an address of said network element in a neighbor pending list, in response to receiving the first unreliable packet;
        sending a reliable packet to said network element; and
        if an acknowledgement to said reliable packet is received from said network element, accepting said network element as a neighbor, wherein said accepting said network element as a neighbor is done by moving said address of said network element from said neighbor pending list to a neighbor list.

2. The method of claim 1, further comprising:
    if said address of said network element is in said neighbor list,
        updating a neighbor hold count for said network element.

3. The method of claim 1, further comprising:
determining if said address of said network element is in a dampening list.

4. The method of claim 3, further comprising:
if said address of said network element is in said dampening list,
updating a value of a reliability count of said network element to reflect higher reliability of said network element.

5. The method of claim 4, further comprising:
if said value of said reliability count is a maximum value,
moving said address of said network element from said dampening list to said neighbor pending list.

6. The method of claim 5, wherein said maximum value is predetermined.

7. The method of claim 5, wherein said maximum value is dynamically adjusted according to a traffic condition in said network.

8. The method of claim 5, further comprising:
if said network element is not in said dampening list,
adding said address of said network element to said dampening list, and
setting said value of said reliability count of said network element to said maximum value.

9. The method of claim 8, further comprising:
setting said neighbor hold count for said network element; and
sending a second unreliable packet to said network element.

10. The method of claim 4, further comprising:
initiating a neighbor pending timer.

11. The method of claim 10, further comprising:
if said acknowledgement to said reliable packet is not received before said neighbor pending timer expires,
removing said address of said network element from said neighbor pending list, and
updating said value of said reliability count to reflect lower reliability of said network element.

12. The method of claim 10, further comprising:
if said acknowledgement to said reliable packet is received before said neighbor pending timer expires,
moving said address of said network element from said neighbor pending list to said neighbor list, and
removing said address of said network element from said dampening list.

13. A network device comprising:
a processor; and
a network interface coupled to said processor, wherein
said network interface is configured to receive a first unreliable packet from a network element, and
said processor is configured to:
store an address of said network element in a neighbor pending list, in response to receipt of the first unreliable packet,
send a reliable packet to said network element, and
accept said network element as a neighbor, if an acknowledgement to said reliable packet is received from said network element, wherein said accepting said network element as a neighbor is done by moving said address of said network element from said neighbor pending list to a neighbor list.

14. The network device of claim 13, wherein said processor is further configured to
if said address of said network element is in said neighbor list,
update a neighbor hold count for said network element.

15. The network device of claim 14, wherein said processor is further configured to
set said neighbor hold count for said network element; and
send a second unreliable packet to said network element.

16. The network device of claim 13, wherein said processor is further configured to
determine if said address of said network element is in a dampening list.

17. The network device of claim 16, wherein said processor is further configured to
if said address of said network element is in said dampening list,
update a value of a reliability count of said network element to reflect higher reliability of said network element.

18. The network device of claim 17, wherein said processor is further configured to
if said value of said reliability count is a maximum value,
move said address of said network element from said dampening list to said neighbor pending list.

19. The network device of claim 18, wherein said maximum value is predetermined.

20. The network device of claim 18, wherein said maximum value is dynamically adjusted according to a traffic condition in said network.

21. The network device of claim 18, wherein said processor is further configured to
if said network element is not in said dampening list,
add said address of said network element to said dampening list, and
set said value of said reliability count of said network element to said maximum value.

22. The network device of claim 13, wherein said processor is further configured to
initiate a neighbor pending timer.

23. The network device of claim 22, wherein said processor is further configured to
if said acknowledgement to said reliable packet is not received before said neighbor pending timer expires,
remove said address of said network element from said neighbor pending list, and
update a value of a reliability count to reflect lower reliability of said network element.

24. The network device of claim 22, further comprising:
if said acknowledgement to said reliable packet is received before said neighbor pending timer expires,
move said address of said network element from said neighbor pending list to a neighbor list, and
remove said address of said network element from a dampening list.

25. A network device comprising:
means for establishing bi-directional connectivity of a network element in a network, comprising
means for receiving a first unreliable packet from said network element;
means for storing an address of said network element in a neighbor pending list, in response to receiving the first unreliable packet;
means for sending a reliable packet to said network element; and
means for accepting said network element as a neighbor if an acknowledgement to said reliable packet is received from said network element, wherein said accepting said network element as a neighbor is done by moving said address of said network element from said neighbor pending list to a neighbor list.

26. The network device of claim 25, further comprising:
means for updating a neighbor hold count for said network element if said address of said network element is in said neighbor list.

27. The network device of claim 25, further comprising:
means for determining if said address of said network element is in a dampening list.

28. The network device of claim 27, further comprising:
means for updating a value of a reliability count of said network element to reflect higher reliability of said network element if said address of said network element is in said dampening list.

29. The network device of claim 28, further comprising:
means for moving said address of said network element from said dampening list to said neighbor pending list if said value of said reliability count is a maximum value.

30. The network device of claim 29, wherein said maximum value is predetermined.

31. The network device of claim 29, wherein said maximum value is dynamically adjusted according to a traffic condition in said network.

32. The network device of claim 28, further comprising:
means for adding said address of said network element to said dampening list if said network element is not in said dampening list, and
means for setting said value of said reliability count of said network element to said maximum value if said network element is not in said dampening list.

33. The network device of claim 25, further comprising:
means for setting a neighbor hold count for said network element; and
means for sending a second unreliable packet to said network element.

34. The network device of claim 25, further comprising:
initiating a neighbor pending timer.

35. The network device of claim 34, further comprising:
means for removing said address of said network element from said neighbor pending list if said acknowledgement to said reliable packet is not received before said neighbor pending timer expires, and
means for updating said value of a reliability count to reflect lower reliability of said network element if said acknowledgement to said reliable packet is not received before said neighbor pending timer expires.

36. The network device of claim 34, further comprising:
means for moving said address of said network element from said neighbor pending list to a neighbor list if said acknowledgement to said reliable packet is received before said neighbor pending timer expires, and
means for removing said address of said network element from a dampening list if said acknowledgement to said reliable packet is received before said neighbor pending timer expires.

37. A computer program product for establishing bi-directional connectivity of a network element in a network, encoded in computer readable media, said program product comprising a set of instructions executable on a computer system, said set of instructions configured to
receive a first unreliable packet from said network element;
store an address of said network element in a neighbor pending list, in response to receipt of the first unreliable packet;
send a reliable packet to said network element; and
if an acknowledgement to said reliable packet is received from said network element,
accept said network element as a neighbor, wherein said accepting said network element as a neighbor is done by moving said address of said network element from said neighbor pending list to a neighbor list.

38. The computer program product of claim 37, wherein said set of instructions is further configured to:
if said address of said network element is in said neighbor list,
update a neighbor hold count for said network element.

39. The computer program product of claim 37, wherein said set of instructions is further configured to:
determine if said address of said network element is in a dampening list.

40. The computer program product of claim 39, wherein said set of instructions is further configured to:
if said address of said network element is in said dampening list,
update a value of a reliability count of said network element to reflect higher reliability of said network element.

41. The computer program product of claim 40, wherein said set of instructions is further configured to:
if said value of said reliability count is a maximum value,
move said address of said network element from said dampening list to said neighbor pending list.

42. The computer program product of claim 41, wherein said maximum value is predetermined.

43. The computer program product of claim 41, wherein said maximum value is dynamically adjusted according to a traffic condition in said network.

44. The computer program product of claim 41, wherein said set of instructions is further configured to:
if said network element is not in said dampening list,
add said address of said network element to said dampening list, and
set said value of said reliability count of said network element to said maximum value.

45. The computer program product of claim 44, wherein said set of instructions is further configured to:
set a neighbor hold count for said network element; and
send a second unreliable packet to said network element.

46. The computer program product of claim 37, wherein said set of instructions is further configured to:
initiate a neighbor pending timer.

47. The computer program product of claim 46, wherein said set of instructions is further configured to:
if said acknowledgement to said reliable packet is not received before said neighbor pending timer expires,
remove said address of said network element from said neighbor pending list, and
update a value of a reliability count to reflect lower reliability of said network element.

48. The computer program product of claim 46, wherein said set of instructions is further configured to:
if said acknowledgement to said reliable packet is received before said neighbor pending timer expires,
move said address of said network element from said neighbor pending list to a neighbor list, and
remove said address of said network element from a dampening list.

49. A system for establishing bi-directional connectivity with a network element in a network comprising:
a central processing module;
a neighbor pending list coupled to said central processing module, wherein said central processing module is configured to store an address of said network element in said neighbor pending list;

a neighbor list coupled to said central processing module, wherein said central processing module is configured to accept said network element as a neighbor by moving said address of said network element from said neighbor pending list to said neighbor list if an acknowledgement to a reliable packet is received from said network element; and a dampening list coupled to said central processing module, wherein said dampening list is configured to store said address of said network element when a value of a reliability count is lower than a maximum value, and said maximum value is dynamically adjusted according to a traffic condition in said network.

50. The system of claim 49, further comprising:

an input-output module coupled to said central processing module, wherein said input-output module is configured to provide input-output interface to said central processing module; and a counter module coupled to said central processing module, wherein said counter module is configured to provide at least one of timing and counting functionality to said central processing module.

* * * * *